March 10, 1964

P. R. GILSON 3,124,317

TAPE TRANSPORT APPARATUS

Filed March 18, 1957

2 Sheets-Sheet 1

INVENTOR.
PAUL R. GILSON

BY Christie, Parker & Hale

ATTORNEYS

March 10, 1964 P. R. GILSON 3,124,317

TAPE TRANSPORT APPARATUS

Filed March 18, 1957 2 Sheets-Sheet 2

INVENTOR.
PAUL R. GILSON

BY Christie, Parker & Hale

ATTORNEYS 3,124,317

TAPE TRANSPORT APPARATUS

Paul R. Gilson, West Covina, Calif., assignor to Burroughs Corporation, Detroit, Mich., a corporation of Michigan Filed Mar. 18, 1957, Ser. No. 646,913
11 Claims. (Cl. 242—55.12)

This invention relates to magnetic tape transport systems, and more particularly, is concerned with means for controlling the length of a slack loop in a vacuum column where vacuum columns are used for tensioning slack loops in the magnetic tape.

Where a strip of material of substantial length, such as a magnetic tape, is to be transported past an operational station, it is necessary to control the rate at which the strip is supplied to the operational station and the rate at which the strip is taken from the operational station. For example, in magnetic tape recording systems, a strip of magnetizable tape is fed from a supply reel to a take-up reel via an operational zone in which are located magnetic recording and reading heads. For some uses, such as memory systems in digital computors, it is necessary to scan quickly the length of the magnetic tape to derive selected information recorded at a particular location. Therefore the apparatus for transporting the tape must be quickly responsive to rapid acceleration and deceleration, and be capable of quickly reversing the direction of tape transport. Due to the inertia of the reeling system, such accelerations and decelerations, particularly with reversal of the tape, are apt to break the tape. For this reason it has been proposed that slack loops be interposed between the supply reel and the operational zone, and between the operational zone and the take-up reel. By this means, the direction of tape transport, or the rate at which the tape is passing the operational zone, may be quickly changed with corresponding change by the supply and take-up reels taking place at a slower rate.

Where slack loops are employed in a tape transport system, some means must be provided for controlling the rate at which the supply reel unwinds the tape, and the rate at which the take-up reel winds the tape, to keep the slack loops at an optimum length. One known method is to hold each of the slack loops in position in a separate vacuum column which is evacuated below the tape loop. Various methods for sensing the length of the slack loop in the vacuum column for controlling the loop length have been employed. Such methods heretofore used have generally involved switching means that is either mechanically actuated by the tape loop or actuated in response to pressure changes occurring as the loop passes a particular point, switching means being located at spaced points along the column. Whenever the loop becomes too short or too long or passes out of the region between the two switching means, the switching means is actuated to either speed up or slow down the associated reel until the loop is again brought within the space between the two switching means. Such an on-off servo control in which the loop is sensed at two discreet spaced points in the vacuum column necessarily results in continuous hunting. While such an arrangement is adequate for control at relatively slow tape speeds, as the tape speeds are increased the system becomes less stable and eventually goes into oscillation. Over-shoots become excessive, and longer and longer vacuum column lengths are required.

In accordance with the present invention, means is provided for achieving a proportional servo control in which the length of the loop is continually sensed and an error voltage generated which is proportional to the deviation of the loop length from some predetermined value. A portional type of servo can be made extremely stable even at very high tape transport speeds in which high accelerations and decelerations are encountered.

In brief, the present invention involves a sensing structure in the form of a capacitor whose capacitive reactance is varied in porportion to the movement of the tape loop within a vacuum column. The capacitor forms one wall of the vacuum column. The capacitive wall is of laminated form. The portion forming the inner surface of the vacuum column in contact with the tape loop is a flexible metal plate. A stiff metal plate having apertures therethrough forms the outer surface of the laminated wall, with means for providing dielectric space between the inner and outer laminations to form the capacitor. The pressure differential existing across the inner plate causes the flexible inner plate to bend inwardly in the evacuated region below the tape loop. As the length of the loop changes, the capacitive reactance of the laminated wall structure changes because spacing between the conductive plates is changed. As the tape loop shortens in the vacuum column, more of the flexible plate is distorted inwardly by the pressure differential exisiting in the evacuated region, further reducing the capacitive reactance of the wall structure. This change in capacitive reactance is used to generate an error signal which in turn controls the reel drive associated with the tape loop to adjust the length of the tape loop accordingly.

For a better understanding of the invention, reference should be had to the accompanying drawings, wherein.

Figures 1, 3:
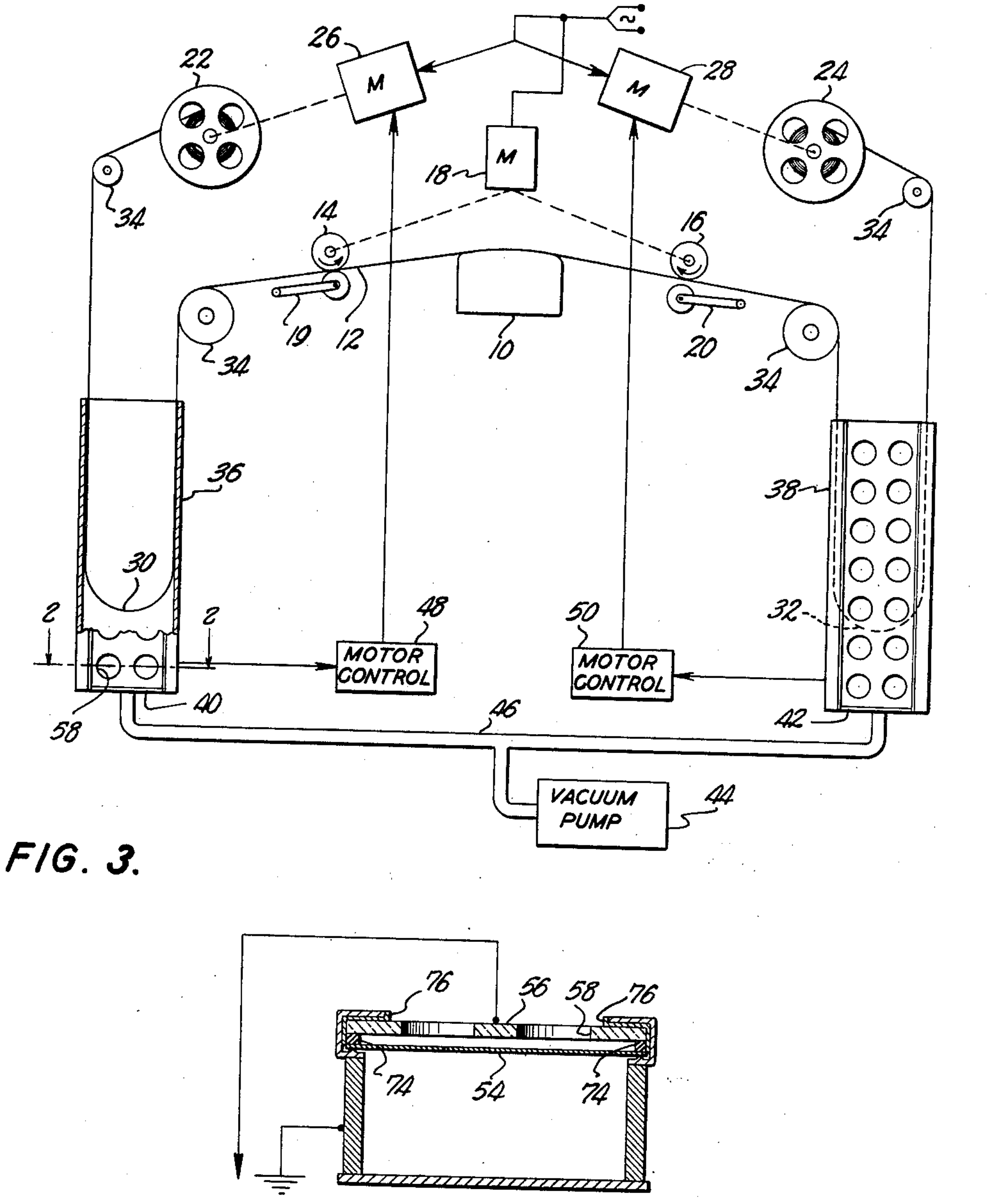
FIG. 1 is a diagrammatic showing of a tape transport system utilizing vacuum columns for tensioning slack loops in the tape and employing the features of the present invention.
FIG. 3 is a sectional view showing an alternative construction of the vacuum column.

Referring to the tape transport system of FIG. 1, the numeral 10 indicates an operational zone generally comprising magnetic pickup or playback heads past which a magnetic tape 12 is driven. The tape 12 is driven in one direction or the other by a pair of capstans 14 and 16 driven with opposite directions of rotation, from a suitable motor 18 connected to a source of electrical power (not shown). The tape 12 is brought into frictional engagement with one or the other of the capstans 14 and 16 by means of pinch rollers, indicated generally at 19 and 20, which may be mechanically or electrically actuated to reverse or stop the tape.

The tape 12 is wound off and onto a pair of reels 22 and 24 which are suitably journaled for rotation by a pair of reel motors 26 and 28. Slack loops are formed in the tape 12, as indicated at 30 and 32, in the regions between the reel 22 and capstan 14, and the reel 24 and capstan 16, respectively. The loops are formed between suitable guides, such as indicated at 34, over which the tape 12 passes.

The loops 30 and 32 extend into the open ends of a pair of vacuum columns, indicated generally at 36 and 38. These vacuum columns include a hollow inner space which is substantially rectangular in cross-section and are closed off at their lower ends by end walls 40 and 42 respectively. The width of the narrow walls of the vacuum columns 36 and 38 are equal to the width of the tape 12 so that the edges of the tape are in contact with the broad walls to form a pressure barrier. The regions below the bight portion of the slack loops 30 and 32 in the vacuum columns are evacuated by means of a vacuum pump 44, suitable fluid couplings such as indicated at 46 extending between the vacuum pump and the lower regions of the vacuum columns.

A pressure differential created across the bight portions of the slack loops 30 and 32 by the vacuum pump 44 tensions the tape in the slack loops and does so without increasing the inertia of the tape transport system. Means forming part of the vacuum columns, which will hereinafter be described in detail, provides continuous sensing of the position of the slack loops along the length of the vacuum columns. The sensing means produces a signal proportional to the longitudinal position of the slack loops. These signals are respectively coupled to suitable motor control circuits 48 and 50 by means of which the torque of the reel motors 26 and 28 are respectively controlled.

The loop length sensing means comprises a variable capacitor that extends the length of the vacuum column and forms one of the broad walls thereof. As best seen in the sectional view of FIG. 2, three walls of the vacuum column are integrally formed or otherwise suitably constructed in substantially channel shape. The fourth wall of the vacuum column is of laminated construction and includes a flexible sheet or plate of conductive material, such as a sheet of aluminum or stainless steel preferably, as indicated at 54. The inner plate 54 forms the inner surface of the fourth wall of the vacuum column. The other plate of the capacitor, indicated at 56, is made of relatively stiff and inflexible material. The plate 56 may be made of a thicker piece of metal, or may be a piece of glass, for example, the inner surface of which is coated with a metallic film to provide a conductive surface thereon. In any event, the stiff outer plate 56 is preferably provided with a plurality of apertures 58 to insure that ambient air pressure exists on the inner side of the plate 56. A thin sheet of dielectric material 60 is positioned between the inner flexible plate 54 and the outer stiff plate 56 of the capacitor, the dielectric sheet extending around the edges of the stiff outer plate 56 to insulate it electrically from the rest of the column and inner plate 54. The entire laminated wall structure forming the capacitor is secured along its edges by channel members 62, which may be integrally formed with the other three walls of the vacuum column.

It will be readily apparent that in the region below the bight portion of the tape slack loop, where a reduced pressure is maintained by the vacuum pump 44, that a differential pressure will exists across the flexible inner plate 54, causing it to bow inwardly. Above the slack loop no such pressure differential exists and the flexible inner plate remains at its normally flat condition.

Since the capacity of a condenser is inversely proportional to the distance between the plates, it will be apparent that as the slack loop moves upward in the column, increasing the length of the evacuated region of the column, the electrical capacity of the laminated wall structure is reduced. This change in capacity provides a means for sensing the position of the tape loop along the extent of the vacuum column.

Figures 2, 4:
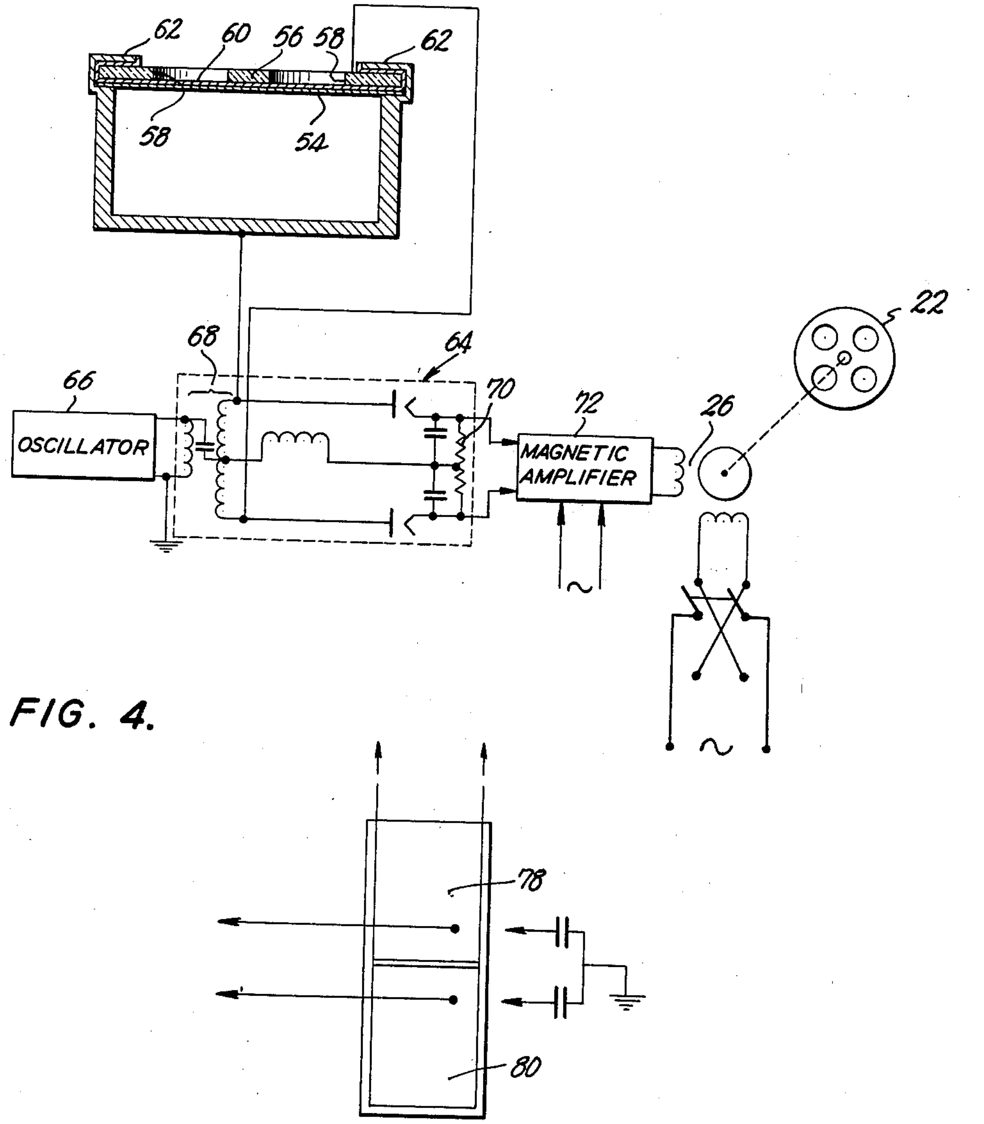
FIG. 2 is a sectional view taken on the line 2—2 of FIG. 1 and includes a schematic wiring diagram of the associated reel motor control circuit.
FIG. 4 is a plan view of a further alternative vacuum column construction.

The variation in electrical capacity of the laminated wall structure of the vacuum column is utilized to control the reel motor associated with the reel adjacent the slack loop in that vacuum column. This may be accomplished by connecting the capacitor formed by the laminated wall structure in a discriminator circuit, such as indicated generally at 64, in such manner as to vary the center frequency of the discriminator and thereby produce variations in the magnitude and polarity of the D.C. output from the discriminator according to changes in capacity of the laminated wall structure of the vacuum column. As shown in FIG. 2, the discriminator circuit 64, which may be a conventional Foster-Seely discriminator for example, has the input thereof coupled to the output of an oscillator 66. The plates 54 and 56 of the laminated wall structure are connected across the secondary of the coupling transformer 68 in the discriminator 64 to form a tuned circuit. The parameters of the discriminator circuit 64 are chosen such that with the tape loop substantially in the center of the vacuum column, the discriminator produces a zero output across the output resistor 70. An increase or decrease of the capacity of the laminated wall structure with lengthening or shortening of the slack loop in the vacuum column shifts the effective center frequency to which the discriminator is tuned. As a result a D.C. voltage is produced across the resistor 70, the magnitude and the polarity of which depends upon the amount of shift in the resonant frequency of the tuned circuit and whether the shift is to be a higher or lower frequency than that of the oscillator 66. This technique of producing a D.C. voltage in response to the changes in the capacitive reactance of a condenser is not new and other well-known methods of generating a D.C. error signal may be employed. For example, the change in capacity of the laminated wall structure with movement of the tape loop may be utilized to vary the output frequency of the oscillator 66 instead of the center frequency of the discriminator 64 to accomplish the same result.

The output derived across the resistor 70 of the discriminator 64 is applied to a suitable magnetic amplifier 72, the output of which is connected to one phase winding of the two-phase motor 26, for example. The other phase winding of the motor is connected through a double-pole double-throw reversing switch 52 to an alternating current source. The magnetic amplifier 72 reverses the phase of the alternating current output signal with changes in polarity of the error signal derived from the resistor 70 and the discriminator 64, thus reversing the direction of the torque produced by the two-phase motor. The torque produced by the motor is a function of the amplitude of the output signal from the magnetic amplifier 72 which in turn is controlled by the magnitude of the D.C. voltage produced across the resistor 70. Thus it will be seen that the circuit of FIG. 2 provides a means for controlling the torque of the reel drive motor, both as to direction and magnitude, with changes in the length of the tape loop in the associated vacuum column. A proportional closed-loop servo is thereby effected for maintaining the length of the slack loop to some predetermined value.

An alternative construction of the laminated wall comprising the variable capacity sensing means is shown in FIG. 3. In this arrangement the inner flexible plate 54 and stiff outer plate 56 are arranged with a substantial air space in between. To this end a pair of dielectric spacers 74 are positioned between the inner and outer plates 54 and 56 along the edges thereof. The flexible plate 54 is loosely anchored along its edges to permit considerable bowing of the flexible plate 54, the amount of bend being limited primarily by the stiffness of the flexible plate. As before, the stiff plate 56 is insulated from the rest of the vacuum column and from the flexible plate 54, as by means of suitable insulation, indicated at 76. While the sensitivity of this arrangement is somewhat less than the arrangement of FIG. 2, it has the advantage that because of the large spacing and the relatively large deflections of the flexible plate 54, it is relatively insensitive to slight variations in the spacing due to imperfections and variations in the manufacture, and in hysteresis effects present in the bending of the flexible plate 54.

It will be noted that in the vacuum column structures of FIG. 2 and FIG. 3, the flexible plate 54 is in electrical contact with the rest of the vacuum column. In such case, either one end of the tuned circuit of the discriminator must be referenced to ground, in which case the vacuum column may be referenced to ground as in FIG. 3, or the flexible plate and associated vacuum column must be insulated from ground. One alternative arrangement is shown in FIG. 4 which may be used to simplify the grounding problem. In this arrangement the outer plate 56 is divided into two electrically insulated sections 78 and 80. The output is then taken from these two plates for connecting into the discriminator circuit. In this manner, two variable capacitors connected in series are provided in which the flexible plate 54 forms a common plate of the two capacitors. The flexible plate 54 can then be grounded, since it is isolated as to D.C. with respect to the rest of the circuit.

From the above description it will be recognized that an improved tape transport system is provided utilizing novel means for sensing the length of the slack loops in the tape, the sensing means providing a proportional control for maintaining the slack loops at some predetermined lengths. The laminated wall structure for the vacuum columns provides a continuous sensing means which is quite sensitive, free from error, and highly reliable. Moreover, it is unaffected by any static charge that normally builds up on the magnetic tape, which has been a problem in other types of electrical sensing arrangements heretofore proposed.

What is claimed is:

1. In a tape transport system for feeding tape between two reels, apparatus for maintaining a slack loop in the tape comprising a rectangular hollow pipe member closed at one end, the internal width of the pipe member being substantially equal to the width of the tape, the slack loop of the tape being inserted in the open end of the pipe, means for maintaining a vacuum in the region between the slack loop and the closed end of the pipe member for tensioning the tape in the slack loop, continuously variable speed drive means associated with the tape feed reel on one side of the slack loop for adjusting the length of the slack loop, and means for controlling said variable speed drive means including a capacitor forming one complete wall of the pipe member, the capacitor having a pair of parallel flat conductive plates separated by a dielectric, the outer plate having openings therethrough to maintin ambient air pressure against the dielectric and the inner plate, whereby the inner plate is distorted inwardly by the pressure differential existing in the evacuated region between the slack loop and the closed end of the pipe to thereby change the capacitance of said capacitor with the length of the slack loop in the pipe member, and means responsive to the change in capacitance of said capacitor for correcting the speed of the variable speed drive means to maintain the loop length substantially constant.

2. In a tape transport system for feeding tape between two reels, apparatus for maintaining a slack loop in the tape comprising a rectangular hollow pipe member closed at one end, the internal width of the pipe member being substantially equal to the width of the tape, the slack loop of the tape being inserted in the open end of the pipe, means for maintaining a vacuum in the region between the slack loop and the closed end of the pipe member for tensioning the tape in the slack loop, continuously variable speed drive means associated with the tape feed reel on one side of the slack loop for adjusting the length of the slack loop, and means for controlling said variable speed drive means including a capacitor forming one complete wall of the pipe member, the capacitor having a pair of parallel flat conductive plates separated by a dielectric, whereby the inner plate is distorted inwardly by the pressure differential existing in the evacuated region between the slack loop and the closed end of the pipe to thereby change the capacitance of said capacitor with the length of the slack loop in the pipe member, and means responsive to the change in capacitance of said capacitor for correcting the speed of the variable speed drive means to maintain the loop length substantially constant.

3. In a tape transport system for feeding tape between two reels, apparatus for maintaining a slack loop in the tape comprising a rectangular hollow pipe member closed at one end, the internal width of the pipe member being substantially equal to the width of the tape, the slack loop of the tape being inserted in the open end of the pipe, means for maintaining a vacuum in the region between the slack loop and the closed end of the pipe member for tensioning the tape in the slack loop, continuously variable speed drive means associated with the tape feed reel on one side of the slack loop for adjusting the length of the slack loop, and means for controlling said variable speed drive means including a capacitor forming one complete wall of the pipe member, means responsive to the pressure differential across the capacitive wall of the vacuum column for continuously varying the capacitance of said capacitor with variations in the length of the slack loop in the pipe member, and means responsive to the change in capacitance of said capacitor for correcting the speed of the variable speed drive means to maintain the loop length substantially constant.

4. Apparatus for sensing and producing a continuous indication of the length of a slack loop in a moving strip of flexible material comprising a hollow rectangular tube having one end thereof closed, one wall of the tube having a laminated structure including a pair of conductive plates separated by a layer of dielectric material, the outer plate being perforated, the slack loop being positioned in the open end of the tube, the tube having an internal width between the laminated wall and the opposite wall substantially equal to the width of the tape, whereby the bight portion of slack loop within the tube effectively closes off the open end of the tube, and means for maintaining a vacuum in the region between the bight portion of the slack loop and the closed end of the tube, whereby the inner plate of the laminated wall is exposed to a pressure differential between opposite surfaces thereof in the region of the laminated wall between the closed end of the tube and the bight portion of the loop.

5. Apparatus as defined in claim 4, wherein the inner plate of the laminated wall structure is thin and flexible, and separated from the outer plate by an air space.

6. Apparatus for sensing and producing a continuous indication of the length of a slack loop in a moving strip of flexible material comprising a hollow rectangular tube having one end thereof closed, one wall of the tube having a laminated structure including a pair of conductive plates separated by a layer of dielectric material, the slack loop being positioned in the open end of the tube, the tube having an internal width between the laminated wall and the opposite wall substantially equal to the width of the tape, whereby the bight portion of slack loop within the tube effectively closes off the open end of the tube, and means for maintaining a vacuum in the region between the bight portion of the slack loop and the closed end of the tube, whereby the inner plate of the laminated wall is exposed to a pressure differential between opposite surfaces thereof in the region of the laminated wall between the closed end of the tube and the bight portion of the loop.

7. Apparatus for sensing and producing a continuous indication of the length of a slack loop in a moving strip of flexible material comprising a hollow rectangular tube having one end thereof closed, one wall of the tube having a laminated structure including a pair of conductive plates separated by a layer of dielectric material, the slack loop being positioned in the open end of the tube, the tube having an internal width between the laminated wall and the opposite wall substantially equal to the width of the tape, whereby the bight portion of the slack loop within the tube effectively closes off the open end of the tube, and means for maintaining a pressure differential across the bight portion of the slack loop, whereby the inner plate of the laminated wall is exposed to a pressure differential between opposite surfaces thereof in the region between one end of the tube and the bight portion of the slack loop.

8. In a tape transport system utilizing a vacuum column for tensioning a slack loop in the tape, apparatus for maintaining the slack loop in the column at some predetermined length, comprising means for sensing the length of the slack loop including first and second parallel conductive plates extending the length of the vacuum column and forming part of the walls thereof, the plates being electrically insulated from each other to form a capacitor, one of the plates being of thin flexible conductive material, means for generating a control signal in response to variations in the capacitance of said capacitor with changes in the length of the slack loop in the vacuum column due to flexing of said one plate, and tape drive means responsive to the control signal for adjusting the length of the slack loop to maintain the capacitance of the capacitor at some predetermined substantially constant value.

9. In a tape transport system for feeding tape between two reels, apparatus for maintaining a slack loop in the tape comprising a rectangular hollow pipe member closed at one end, the slack loop of the tape being inserted in the open end of the pipe, means for maintaining a vacuum in the region between the slack loop and the closed end of the pipe member for tensioning the tape in the slack loop, continuously variable speed drive means associated with the tape feed reel on one side of the slack loop for adjusting the length of the slack loop, variable capacitance means associated with the pipe member and responsive to movement of the slack loop in the pipe member for continuously sensing the relative position of the slack loop, means responsive to changes in the capacitance of said variable capacitance means for generating an electric signal which varies continuously with changes in the position of the slack loop, and means responsive to said electric signal for correcting the speed of the continuously variable drive means to maintain the loop length substantially constant.

10. In a tape transport system for feeding tape between two reels, apparatus for maintaining a slack loop in the tape comprising a rectangular hollow pipe member closed at one end, the internal width of the pipe member being substantially equal to the width of the tape, the slack loop of the tape being inserted in the open end of the pipe, means for maintaining a vacuum in the region bebetween the slack loop and the closed end of the pipe member for tensioning the tape in the slack loop, continuously variable speed drive means associated with the tape feed reel on one side of the slack loop for adjusting the length of the slack loop, and means for controlling said variable speed drive means including a capacitor forming one complete wall of the pipe member, the capacitor having a pair of parallel flat conductive plates separated by a dielectric, a first one of said plates having openings therethrough to communicate pressure differentials to the second one of said plates, said second plate being sufficiently flexible to be distorted inwardly by the pressure differential existing in the evacuated region between the slack loop and the closed end of the pipe to thereby change the capacitance of said capacitor with the length of the slack loop in the pipe member, and means responsive to the change in capacitance of said capacitor for correcting the speed of the variable speed drive means to maintain the loop length substantially constant.

11. In a web storing and sensing device that controls the feeding of a web, the combination of a storage chamber with an open end and a closed end, comprising a plurality of walls, means to cause the passage of a web into and out of said chamber while maintaining a portion of said web in a free loop, portions of said web contacting opposite walls of said chamber to form an isolated subchamber at said closed end, evacuation means connected to said sub-chamber for maintaining a vacuum in said subchamber, vacuum responsive means for continously sensing differential increments in the length of said sub-chamber, and means responsive to said sensing means for controlling the feeding of said web.

References Cited in the file of this patent

UNITED STATES PATENTS

| | | |
|---|---|---|
| 2,368,278 | Warshaw | Jan. 30, 1945 |
| 2,512,372 | Pakala | June 20, 1950 |
| 2,573,870 | Pfund | Nov. 6, 1951 |
| 2,667,786 | Spaulding | Feb. 2, 1954 |
| 2,778,634 | Gams et al. | Jan. 22, 1957 |
| 2,792,217 | Weidenhammer et al. | May 14, 1957 |
| 2,862,675 | MacDonald | Dec. 2, 1958 |
| 2,877,397 | Poschner et al. | Mar. 10, 1959 |

FOREIGN PATENTS

| | | |
|---|---|---|
| 733,807 | Great Britain | July 20, 1955 |